May 8, 1928.

L. A. UMANSKY 1,669,107

AUTOMATIC CONTROLLER

Filed May 9, 1927

Inventor:
Leonid A. Umansky,
by *Alexander F. [illegible]*
His Attorney

Patented May 8, 1928.

1,669,107

UNITED STATES PATENT OFFICE.

LEONID A. UMANSKY, OF SCHENECTADY, NEW YORK, ASSIGNOR TO GENERAL ELECTRIC COMPANY, A CORPORATION OF NEW YORK.

AUTOMATIC CONTROLLER.

Application filed May 9, 1927. Serial No. 189,892.

My invention relates to improvements in automatic controllers for the driving means of a driven element, the number of rotations of which it is desired shall bear a predetermined ratio to the number of rotations of another driven device.

In its broader aspects, my invention relates to a system including two independently rotatable shafts, together with an automatic regulator for the driving means of one of the shafts so that the number of rotations of the two shafts will bear a predetermined ratio to each other, the arrangement being such that this ratio may be predetermined and adjustable so as to vary in accordance with any predetermined desired function as the shafts are rotating.

Figure 1:
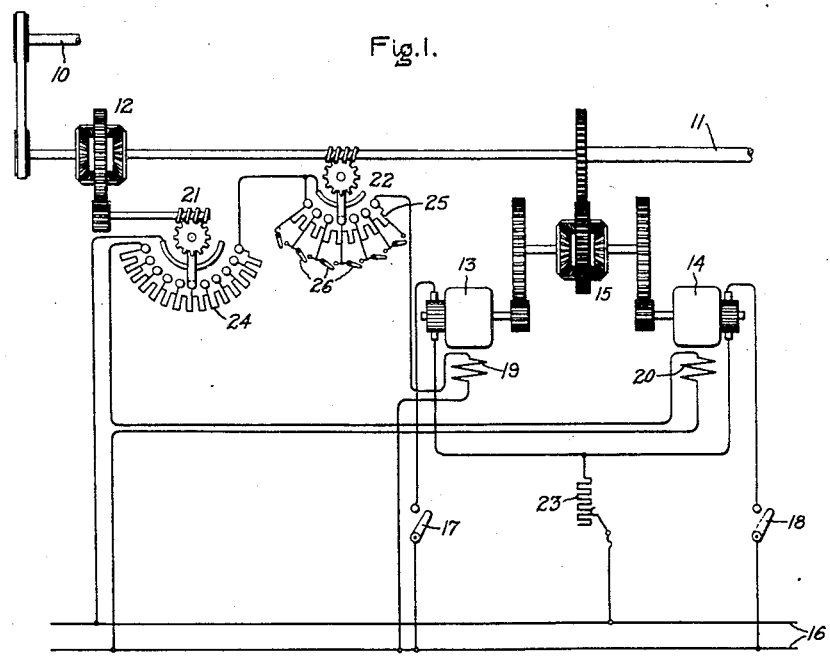
Figure 2:
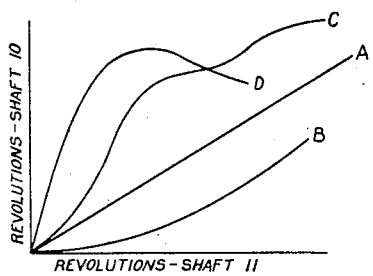

The general principles of my invention will be understood from a consideration of the accompanying drawing in which Fig. 1 shows in a very simple diagram two electric motors connected to drive one of the shafts, together with a plurality of electric controllers and connections whereby the shaft driven by these electric motors will rotate at a definite ratio with respect to the rotation of another shaft, the arrangement being such that the ratio of rotation of the first shaft will be capable of adjustment and nevertheless maintain the adjusted relation. Fig. 2 shows the ratios of the rotations of the two shafts which are obtainable through the operation of the system of Fig. 1.

Referring to Fig. 1, the shaft 10 is mounted for independent rotation with respect to the shaft 11. This shaft 10 may be rotated through any angular movement by any suitable means. The shaft 11 will be connected to operate a device through an angular movement which bears a predetermined but adjustable ratio to the angular movement of the shaft 10. These shafts are interconnected so that no power need be transmitted from the one shaft to the other. I have shown this interconnection as a differential 12, the ring gear of which is operated at a speed and in a direction determined by the relative rotations of the two shafts. The shaft 11 is driven by the electric motors 13 and 14 and this shaft is connected to the armatures of these motors through gearing including the differential 15 so that the shaft 11 will rotate in a direction and at a speed determined by the relative speeds and rotations of the motors 13 and 14. It will be observed that the armatures of the motors 13 and 14 are connectible in multiple relation with the source of supply 16 by the closing of the disconnecting switches 17 and 18, respectively. The separately excited field winding 19 of the motor 13 is also energized from the source 16, as is the separately excited field winding 20 of the motor 14.

In order to regulate the rotations of the motors 13 and 14 so that the number of rotations of the shaft 11 will bear a predetermined but adjustable ratio to the number of the rotations of the shaft 10, I have provided an automatic control for the motor field windings 19 and 20. This automatic control includes a rheostat 21 which is driven by the ring gear of the differential 12. This rheostat is included in the field winding circuits of both motors. Cooperating with the rheostat 21 is a second rheostat 22 which is also included in the circuit of field winding 19, but is not included in the circuit of the field winding 20. This rheostat 22 is driven in a direction and between limits which correspond to the direction and extent of the angular movement of the shaft 11. I have shown the contact arm of the rheostat as being driven from a gear which is driven by a worm, which in turn is driven from the shaft 11.

As thus constructed and arranged, the operation of my invention is as follows: Assume that the disconnecting switches 17 and 18 are closed and the starting rheostat 23 is adjusted so that the motors 13 and 14 will be caused to accelerate to substantially full speed. Because of the fact that these motors are intended to run at substantially equal speeds except when the shaft 10 is rotated, the shaft 11 will not rotate, it being necessary that there be a speed difference between the motors 13 and 14 in order that the shaft 11 may be driven as a differential of the rotations of the two motors. Assume that the shaft 10 is now rotated through a predetermined angular movement. This in turn will be transmitted to the rheostat 21 so that the movable contact element thereof is operated and the energization of the field windings 19 and 20 is varied. It will be observed that the arrangement of the rheostat 21 is such that as the variable resistor 24 thereof is inserted in or removed from the field winding 20, the resistor is correspondingly and oppositely removed from or inserted in the field winding 19. A difference in the speeds of rotation of the motors 13 and 14 is thus brought about, and through the action of the differential gearing 15, the shaft 11 is caused to rotate with an angular movement which bears a predetermined ratio to the angular movement of the shaft 10.

The ratio of the rotations of the shafts effected through the operation of the automatic controller 21 may be represented by the curve A of Fig. 2. It will be seen that this curve has straight line characteristics, indicating that there is a fixed ratio between the rotation of the two shafts. In order to obtain ratio curves corresponding to curves B, C or D of Fig. 2, or any other curves as desired, the automatically operated rheostat 22 is provided. As the shaft 11 rotates under the control of the speed difference of the motors 13 and 14, the contact arm of the rheostat 22 is correspondingly operated to vary the resistor 25. Since this rheostat merely varies the energization of the motor field winding 19 without varying the energization of the field winding 20, the speed of the motor 13 will vary with reference to the speed of motor 14 and this variation may be predetermined and is adjustable so that the ratio of the rotations of the shafts 11 and 10 may be any desired value. Thus by suitably proportioning the steps of the resistor 25, the ratio of the number of rotations of the shaft 11 with respect to the number of rotations of the shaft 10, may be such as would correspond to the curve B of Fig. 2.

By varying the steps of the resistor 25, as by means of the switches 26, the said ratio may be either represented by the curve C or the curve D or any curve which the operator desires.

What I claim as new and desire to secure by Letters Patent of the United States, is:

1. In combination, two independently rotatable shafts, driving means for the first of said shafts, and means for automatically regulating said driving means to cause the number of rotations of said first shaft to be a predetermined but adjustable ratio of the number of rotations of the second shaft, the said means including a controller automatically operated by one of said shafts which varies the said ratio while the shafts are rotating, the said controller being adjustable to predetermine the variation of said ratio.

2. In combination, two independently rotatable shafts, dynamo-electric driving means for the first of said shafts, a controller for said driving means automatically operated in response to the relative rotations of said shafts for causing the rotation of said first shaft to bear a predetermined ratio to the rotation of the second shaft, and a second controller operated by one of said shafts for automatically varying the said ratio as the shafts are rotating, the said second controller being manually adjustable to predetermine the variation of the said ratio.

In witness whereof, I have hereunto set my hand this 6th day of May, 1927.

LEONID A. UMANSKY.